(12) United States Patent
Boulanger et al.

(10) Patent No.: US 8,833,776 B2
(45) Date of Patent: Sep. 16, 2014

(54) CARRIAGE FOR TRANSPORT OF AN AIRCRAFT ENGINE MODULE

(75) Inventors: Pascal Boulanger, Cormeilles en Vexin (FR); Johnny Deschamps, Saint Mammes (FR); Alain Fougeres, Avon (FR); Jacques Marchand, Machault (FR)

(73) Assignee: Snecma, Paris (FR)

( * ) Notice: Subject to any disclaimer, the term of this patent is extended or adjusted under 35 U.S.C. 154(b) by 85 days.

(21) Appl. No.: 13/510,764

(22) PCT Filed: Nov. 19, 2010

(86) PCT No.: PCT/EP2010/067857
§ 371 (c)(1),
(2), (4) Date: May 18, 2012

(87) PCT Pub. No.: WO2011/061306
PCT Pub. Date: May 26, 2011

(65) Prior Publication Data
US 2012/0228839 A1    Sep. 13, 2012

(30) Foreign Application Priority Data

Nov. 20, 2009 (FR) ..................................... 09 58239

(51) Int. Cl.
*B62B 1/00*    (2006.01)
*B62B 7/02*    (2006.01)
*B64F 5/00*    (2006.01)

(52) U.S. Cl.
CPC ................ *B64F 5/0036* (2013.01); *B64F 9/06* (2013.01)
USPC ....................................... 280/35; 380/47.131

(58) Field of Classification Search
CPC .............. B62B 5/0083; B62B 2202/41; B62B 2202/60; B62B 2202/67; B62B 3/00; B62B 3/04; B62B 3/10; B62B 3/104; F16M 5/00; F16M 7/00; F16M 11/20; F16M 13/00; B66C 23/48; B66C 23/485; B25H 1/00; B25H 1/007
USPC ............ 280/35, 47.131, 29, 638, 79.11, 79.3, 280/79.6; 269/17; 29/281.1; 410/47, 49; 248/678, 680, 681, 346.01, 346.02, 248/346.03
See application file for complete search history.

(56) References Cited

U.S. PATENT DOCUMENTS

| 1,481,503 A | 1/1924 | Carswell et al. |
| 1,600,835 A | 9/1926 | Manley |

(Continued)

FOREIGN PATENT DOCUMENTS

| DE | 34 27 042 A1 | 2/1985 |
| DE | 200 23 688 U1 | 8/2005 |

(Continued)

OTHER PUBLICATIONS

International Search Report issued Dec. 29, 2010 in PCT/EP2010/067857.

(Continued)

*Primary Examiner* — J. Allen Shriver, II
*Assistant Examiner* — James M Dolak
(74) *Attorney, Agent, or Firm* — Oblon, Spivak, McClelland, Maier & Neustadt, L.L.P.

(57) ABSTRACT

A carriage configured to transport an aircraft engine module from a preparation station to an assembly station includes, on a dolly, a reinforcement structure configured to be made horizontally mobile by sliding on balls, two vertically mobile brackets, and moving fingers to slide under the module's supports. The module is then supported by the carriage in a safe manner, can be raised and transported, and can also be temporarily overturned to check that its interior is empty.

10 Claims, 3 Drawing Sheets

(56) References Cited

U.S. PATENT DOCUMENTS

Figure 1:
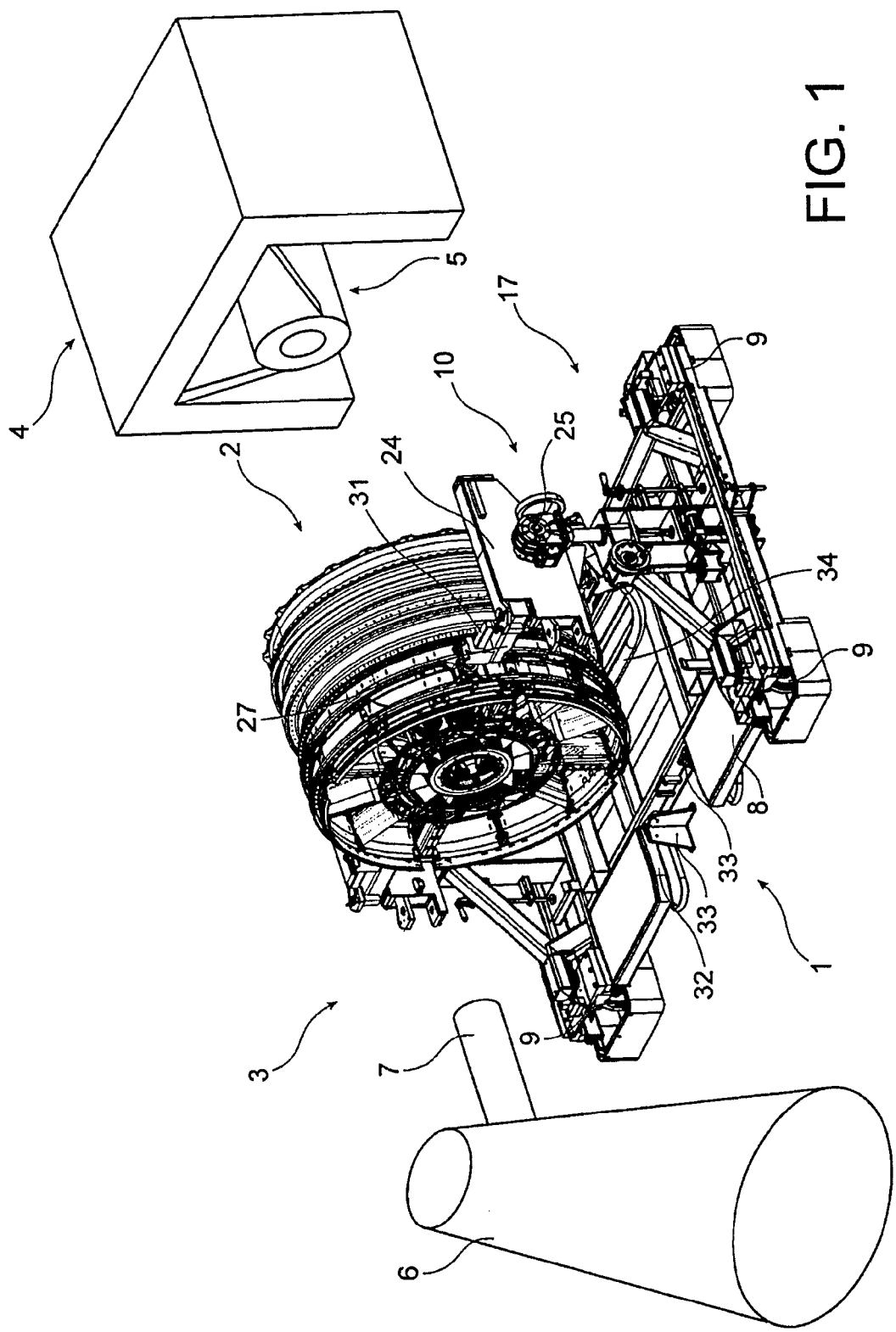

| | | | |
|---|---|---|---|
| 1,812,585 A | 6/1931 | Collins | |
| 2,825,477 A | 3/1958 | Ross | |
| 4,200,273 A | 4/1980 | Das Gupta et al. | |
| 4,412,774 A * | 11/1983 | Legrand et al. | 414/589 |
| 4,520,974 A * | 6/1985 | Debeneix | 294/67.1 |
| 4,660,796 A * | 4/1987 | Garrec | 248/544 |
| 4,691,904 A | 9/1987 | Armstrong | |
| 5,383,652 A * | 1/1995 | Van Den Berg | 269/17 |
| 5,575,607 A * | 11/1996 | Grout et al. | 414/589 |
| 5,653,351 A * | 8/1997 | Grout et al. | 212/315 |
| 5,816,367 A * | 10/1998 | Lilja et al. | 244/137.1 |
| 5,863,034 A | 1/1999 | Vauter | |
| 5,870,824 A * | 2/1999 | Lilja et al. | 29/889.1 |
| RE36,170 E * | 3/1999 | Lilja et al. | 414/343 |
| 6,000,903 A * | 12/1999 | Hatch et al. | 414/778 |
| 6,170,141 B1 * | 1/2001 | Rossway et al. | 29/281.1 |
| 6,292,999 B1 * | 9/2001 | Rossway et al. | 29/559 |
| 7,677,582 B2 * | 3/2010 | Hedley et al. | 280/79.4 |
| 7,770,292 B2 * | 8/2010 | Stretton | 29/889.1 |
| 7,779,540 B2 * | 8/2010 | McCaffrey et al. | 29/889.2 |
| 8,057,140 B2 * | 11/2011 | Entwistle | 410/47 |
| 8,162,575 B2 * | 4/2012 | Knurr | 410/47 |
| 8,262,050 B2 * | 9/2012 | Linz | 248/554 |
| 8,621,873 B2 * | 1/2014 | Robertson et al. | 248/678 |
| 8,677,589 B2 * | 3/2014 | Ziekow et al. | 29/281.1 |
| 2009/0020934 A1 | 1/2009 | Metcalf et al. | |
| 2013/0256280 A1 | 10/2013 | Boulanger et al. | |

FOREIGN PATENT DOCUMENTS

| | | |
|---|---|---|
| EP | 1 518 783 A1 | 3/2005 |
| FR | 868 161 A | 12/1941 |
| FR | 2 389 768 A1 | 12/1978 |

OTHER PUBLICATIONS

International Search Report issued Dec. 29, 2010 in PCT/EP2010/067858 with English Translation.

U.S. Appl. No. 13/509,304, filed May 11, 2012, Boulanger, et al.

* cited by examiner

CARRIAGE FOR TRANSPORT OF AN AIRCRAFT ENGINE MODULE

The invention relates to a carriage for transport of an aircraft engine module.

Transporting an aircraft engine module before it is assembled is often difficult since these modules are bulky, heavy but delicate items, which must be put in a precise position for docking with the adjacent modules in order to assemble the engine. In addition, some modules must be turned over before being installed, in order to check that no foreign bodies have been introduced between the rotor and the stator and are not therefore likely to damage the engine when it is operated.

The traditional method for accomplishing these operations consists in using a hoist to place the module on a non-specialist carriage or on a wheeled pallet, moving the carriage as far as the place of assembly of the engine, and of once again raising the module using a hoist in order to turn it over and dock it. These operations are burdensome, difficult and tiring since substantial forces must occasionally be provided. They require intervention of two persons. The most delicate points are those when the module is deposited on the carriage without impact, when the module is temporarily turned over, and when it is docked with the module with which it is assembled, when accuracy of within two millimeters is required. It follows that the procedure is quite a lengthy one.

U.S. Pat. No. 2,825,477 describes a carriage for sharing an aircraft engine including a wheeled frame, two extendable vertical arms, and a cradle supported by transverse axes at the tops of the arms, on which the engine may be installed and attached, and which rotates around the transverse axes in such a way that it has variable inclination.

The invention concerns a transport carriage of a particular type, which is specially designed for aircraft engine modules, and which is also designed to facilitate moving them between an original location, which may be a workstation where they have been prepared, and a place of assembly of the adjacent modules. It satisfies the particular constraint that it must temporarily tip the module to check its condition.

In a general form, it concerns a carriage for transporting an aircraft engine module, firstly including a wheeled frame and a reinforcement structure for receiving the installed model on the frame, characterised in that the reinforcement structure includes two module receiving structures positioned on two lateral sides of the carriage, where each of the receiving structures includes a vertically moving arm, a bracket at an upper end of the arm, where the bracket rotates around a transverse axis of the carriage, a module support finger, which moves on the bracket in a transverse direction of the carriage, and a means of locking the module on the finger.

Moreover, in an aspect a combination of balls assembled on the frame, on which the reinforcement structure slides, and clamps for tightening the reinforcement structure on the frame are provided.

The fingers can therefore be moved between a position in which they are close to one another, and in which they can grasp the module and raise it, and a position in which they are retracted, which enables the module to be conveniently positioned between them. The locking means hold the module on the fingers even when the brackets are turned over. By raising the brackets the module can be grasped.

The module can be rotated through large angles, sufficient to rotate it by a quarter circle between a normal horizontal position and a vertical position in which impurities are able to fall out, by directly controlling the rotation of the shafts by which the brackets are connected to the arms, using a rotation device belonging to the arm when the shaft belongs to the bracket (or vice versa). The fingers and the locking means are designed in order to stop untimely rotational movements of the module by cooperating with the module support means which are in contact with them, by means, for example, of catches with flat faces or adjustments of embedded polygonal sections, notably square sections.

The position of the carriage during reception or removal of the module can be adjusted and held by operating a positioning device, which can consist of a slot with oblique or beveled edges positioned on a lengthways face of the frame and a fixed catch.

Finer adjustment of the position of the carriage, or rather of its reinforcement structure, which is very useful for correctly positioning the brackets, is given by the combination of the balls and the brakes: it is then possible either to immobilise the reinforcement structure on the frame, or to move it on it in any direction of a plane with any degree of accuracy which may be desired. In combination with the vertically moving arms it is also possible to move the brackets in all spatial directions, and by this means also to facilitate the grasping of the module.

According to a favourable design of the invention, the fingers rotate around axes of the brackets. As for the locking means, they can include clamps with a closing device, installed on the fingers.

Figure 2:
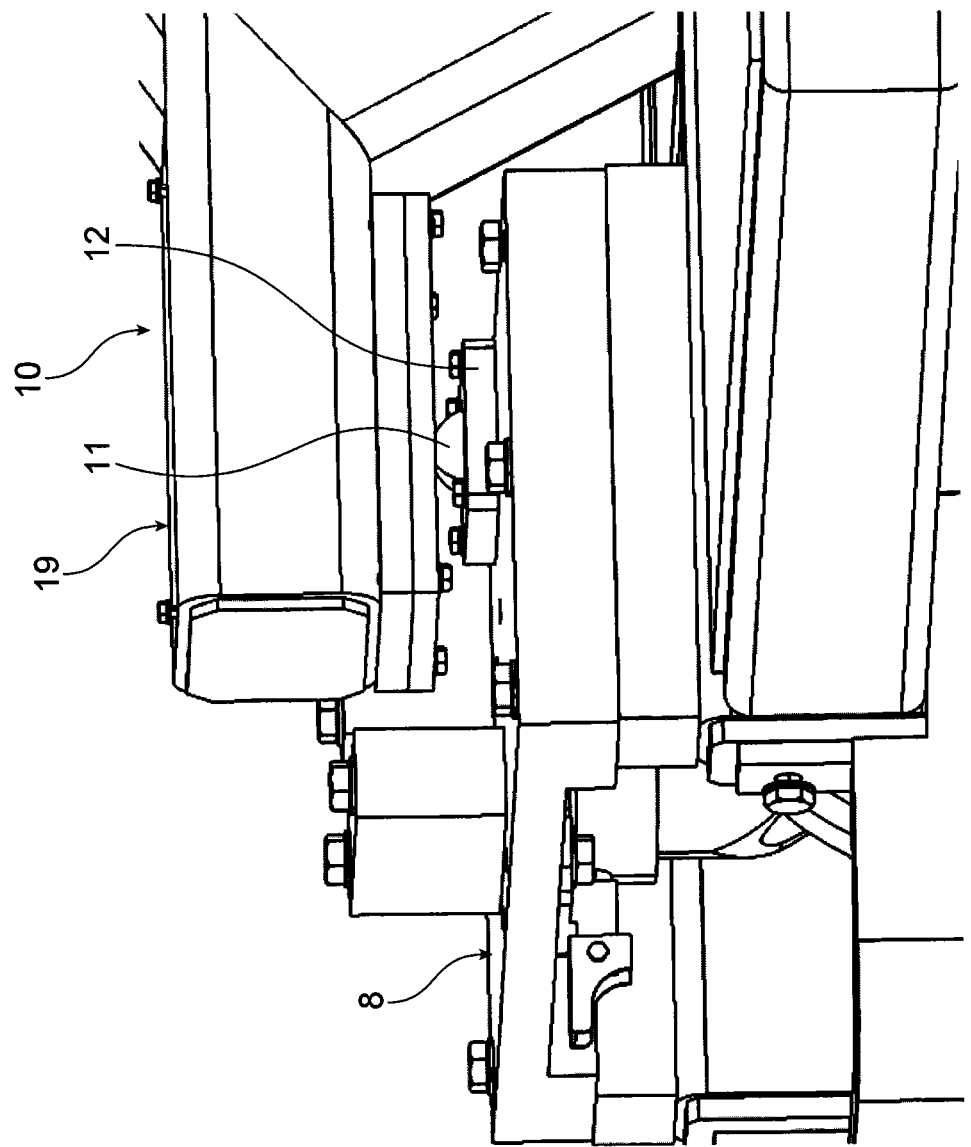
Figure 3:
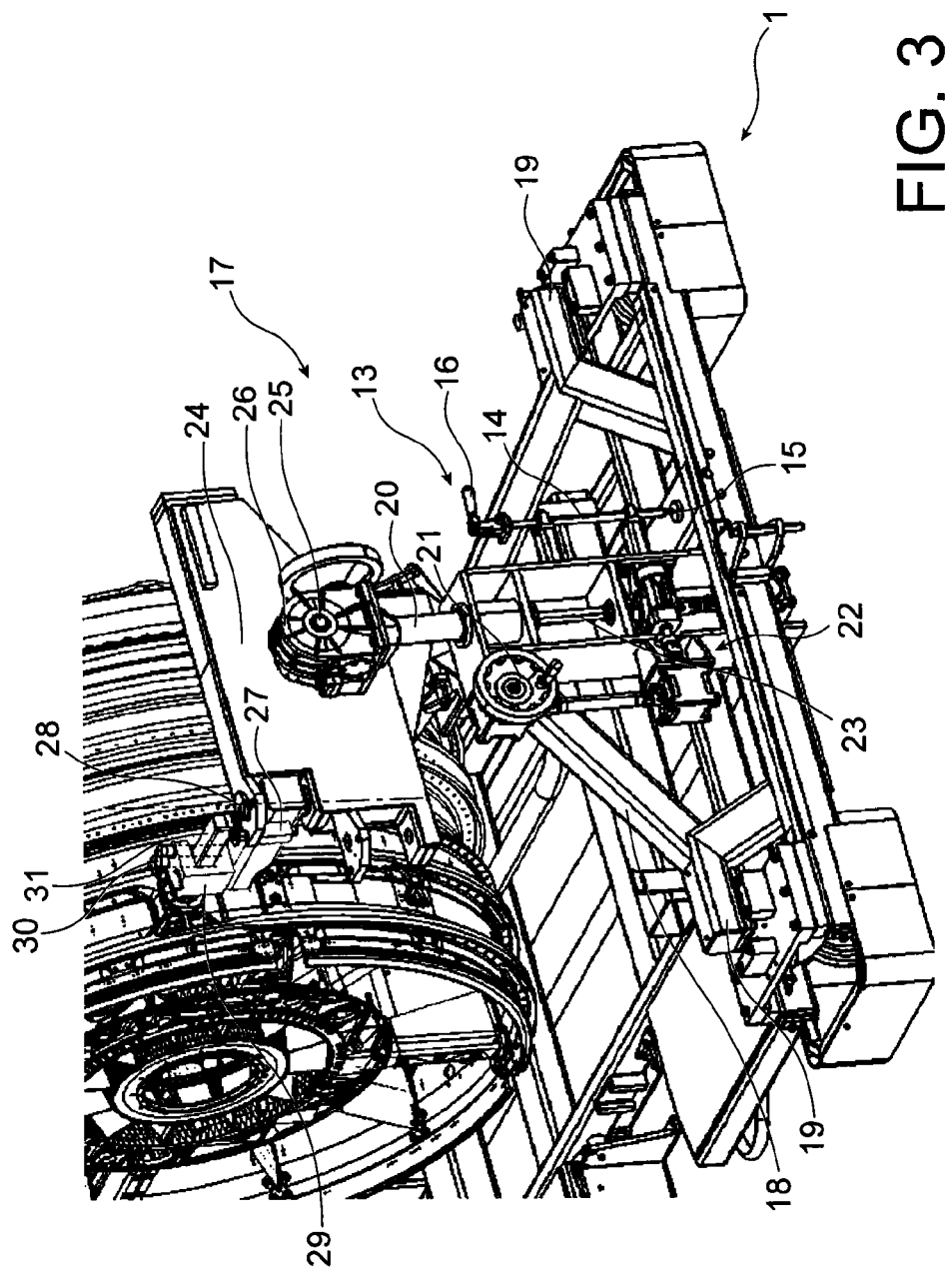

The invention will now be described in greater detail with reference to the following figures:

FIG. 1 is a general view of the carriage and its surrounds,
FIG. 2 is a detailed view representing the junction between the frame and the reinforcement structure,
and FIG. 3 is a detailed view representing more particularly the means of support of the module on the carriage.

The carriage bears reference 1 in FIG. 1. It then carries module 2, which in this case is a major assembly module, with a fan, of an aircraft engine. Module 2 was previously installed on a fixed bracket 6, and it must be transported on carriage 1 as far as an assembly gantry 4, where it must be docked with another module 5, or directly to gantry 4. Station 3 consists of the bracket 6 from which an oblique column 7 rises on which module 2 is initially slid.

Carriage 1 includes a lower frame 8, wheels 9 installed on the frame 8 enabling carriage 1 to be moved, and a reinforcement structure 10 installed on carriage 1. Module 2 rests on carriage 1 by means of reinforcement structure 10. FIG. 2 shows that reinforcement structure 10 is installed sliding on carriage 1, lying on tabs 19 with a flat lower surface on balls 11 held on the carriage by low walls 12 which surround them. This design enables reinforcement structure 10 to be moved with great accuracy whilst leaving carriage 1 immobile, in order to position reinforcement structure 10 with great accuracy relative to module 2, and also module 2 relative to adjacent module 5 or to gantry 4, and by this means to facilitate the extreme phases of the process. During transport, reinforcement structure 10 is however held securely attached to carriage 1 by clamps 13 which connect them, which can be toggle clamps of a known type, each of which includes a moving rod 14 ending in a skid 15, which can be pressed under carriage 1 by the action of a lever 16 installed on the reinforcement structure and consisting of a lever ending in a cam. Carriage 1 and reinforcement structure 10 are pressed against one another when rods 14 are pulled. Other clamps, which are not represented, can be added to lock wheels 9.

Reinforcement structure 10 bears, at each of the lateral sides of carriage 1, a structure 17 receiving module 2 which is illustrated in greater detail in FIG. 3. Each receiving structure 17 includes a frame 18 with rigid metal members which is approximately lozenge-shaped, and which finishes at tabs 19.

Frame 18 carries in its centre an arm 20 pointing vertically, and which also slides vertically under the action of a handle 21 which controls it by a transmission 22 finishing with an endless screw 23. The top of arm 20 carries a bracket 24 shaped like a thick plate, aligned in a lengthways plane of carriage 1 and connected to arm 20 by a shaft 25 belonging to bracket 24, aligned in the transverse direction of carriage 1, and which can be driven by a pneumatic screwdriver 26 belonging to arm 20 so as to tip up bracket 24 by a quarter turn or more. Bracket 24 carries, at a forward end, a finger 27 able to rotate around a shaft 28 positioned, in the represented position, in the vertical direction. Its upper face supports a clamp 29 which can delimit a closed volume when a closure device, consisting for example of pins 30, is installed through its branches. The aperture of clamp 29 is aligned towards the centre of carriage 1, and then finger 27 is aligned towards the front of carriage 1.

Module 2 bears two rods 31 with a square section, aligned in opposite radial, and roughly horizontal, directions in the original position, belonging to devices, known to the skilled man in the art, which can be embedded in module 32 to facilitate its gripping, and then removed. Rods 31, which are of polygonal section, adjusted in clamps 29 of identical section, firmly hold module 2 and prevent it rotating in untimely fashion.

A description of how carriage 1 is used is now given. It is brought close to station 3, on the column 7 of which module 2 is originally positioned. The position of carriage 1 can be adjusted by a gully 32 consisting of a slot of frame 8 at its forward edge, and into which penetrate embossments 33 recessed in the floor at a determined position relative to station 3 as carriage 1 advances. The lateral limits, whether oblique or beveled, of gully 32 slide on embossments and centre carriage 1 relative to station 3. The approach movement is stopped by a stop rail 34 to stop carriage 1, which is securely attached to one of brackets 24, against a lower point, which is not represented, of module 2.

Carriage 1 is then very close to the reception position of module 2. Its position is adjusted by moving reinforcement structure 10 on balls 11, and then by retightening clamps 13. The heights of brackets 24 are adjusted by individually moving arms 20. Fingers 27 are rotated, from a position in which they are pointing towards the front of carriage 1, to a position in which they transversely point inwardly, one towards the other, and in which clamps 29 surround rods 31. Pins 30 are positioned so as to completely immobilise these rods. A small upwards movement of arms 10 enables module 2 to be raised from column 7, after which carriage 1 can be moved to remove module 2. Pneumatic screwdriver 26 is switched on before arriving at the gantry in order to overturn module 2 by positioning its axis vertically, and causing all impurities which may have been introduced between its rotor and its stator fall out. An overturning operation in reverse is then accomplished to make the rotational axis of module 2 horizontal once again. Since the support of module 2 is caused by flat faces of rods 31 on flat faces of fingers 27, the overturning operation is accomplished without obstacles. Carriage 1 is positioned adjacent to gantry 4, where gully 32 or a comparable gully located at the other lengthways side can still be operated with embossments comparable to embossments 33. The position of module 2 is adjusted by once again moving reinforcement structure 20 relative to frame 8, and by moving arms 10, such that module 2 docks with adjacent module 5 by these movements in all directions; the assembly of modules 2 and 5 can then follow, after which clamps 29 are unlocked, and fingers 27 are withdrawn from rods 31. Carriage 1 is removed. No hoist is used. In precisely the same manner, module could be assembled directly on the supporting elements of gantry 4, if no other module has yet been installed on it.

The invention claimed is:

1. A carriage for transporting an aircraft engine module, comprising:
    a wheeled frame; and
    a reinforcement structure to receive an installed model on the frame, wherein the reinforcement structure includes:
        two module receiving structures positioned on two lateral sides of the carriage, wherein each module receiving structure includes:
            a vertically moving arm,
            a bracket at an upper end of the arm, which is rotatable around a transverse axis of the carriage,
            a module support finger, which is movable on the bracket in a transverse direction of the carriage, and
            a lock to lock the module, balls to slidingly support the reinforcement structure, the balls being installed on the frame, and wherein the balls support sliding movements of the reinforcement structure in all directions of a plane; and
        first clamps to tighten the reinforcement structure on the frame.

2. A carriage for transporting an aircraft engine module according to claim 1, wherein the module support fingers rotate around supporting axes.

3. A carriage for transporting an aircraft engine module according to claim 2, wherein the locks include second clamps including closure devices, installed on the module support fingers.

4. A carriage for transporting an aircraft engine module according to claim 3, wherein the frame includes an edge including a positioning device.

5. A carriage for transporting an aircraft engine module according to claim 4, wherein the positioning device includes a slot of the edge of the frame with oblique or bevelled lateral limits.

6. A carriage for transporting an aircraft engine module according to claim 4, further comprising a catch to stop the aircraft engine module.

7. A carriage for transporting an aircraft engine module according to claim 5, further comprising a catch to stop the aircraft engine module.

8. A carriage for transporting an aircraft engine module according to claim 1, wherein the module support fingers include polygonally hollowed clamps that cooperate with rods that each include a complementary polygonal cross-section.

9. A carriage for transporting an aircraft engine module according to claim 1, wherein the brackets are rotatable to transmit a rotation of at least a quarter rotation to the aircraft engine module.

10. A carriage for transporting an aircraft engine module according to claim 1, wherein the first clamps include a movable rod tightened between a support and the carriage, tabs are provided around the support, and the tabs each include a flat lower surface lying on top of one of the balls.

\* \* \* \* \*

UNITED STATES PATENT AND TRADEMARK OFFICE
CERTIFICATE OF CORRECTION

| | | |
|---|---|---|
| PATENT NO. | : 8,833,776 B2 | Page 1 of 1 |
| APPLICATION NO. | : 13/510764 | |
| DATED | : September 16, 2014 | |
| INVENTOR(S) | : Pascal Boulanger et al. | |

It is certified that error appears in the above-identified patent and that said Letters Patent is hereby corrected as shown below:

In The Specification

In column 3, line 33, "beveled, of gully 32 slide on embossments" should read --bevelled, of gully 32 slide on embossments 33--.

In column 4, line 5, "module" should read --module 2--.

Signed and Sealed this
Twenty-fourth Day of March, 2015

Michelle K. Lee
*Director of the United States Patent and Trademark Office*